United States Patent
Yokoi (10) Patent No.: US 9,276,676 B2
(45) Date of Patent: Mar. 1, 2016

(54) VISIBLE RAY COMMUNICATION SYSTEM AND METHOD FOR TRANSMITTING SIGNAL

(75) Inventor: Atsuya Yokoi, Yokohama (JP)

(73) Assignee: Samsung Electronics Co., Ltd (KR)

( * ) Notice: Subject to any disclaimer, the term of this patent is extended or adjusted under 35 U.S.C. 154(b) by 574 days.

(21) Appl. No.: 13/131,192

(22) PCT Filed: Nov. 24, 2009

(86) PCT No.: PCT/KR2009/006919
§ 371 (c)(1),
(2), (4) Date: May 25, 2011

(87) PCT Pub. No.: WO2010/062092
PCT Pub. Date: Jun. 3, 2010

(65) Prior Publication Data
US 2011/0229147 A1 Sep. 22, 2011

(30) Foreign Application Priority Data
Nov. 25, 2008 (JP) .................. 2008-298940

(51) Int. Cl.
*H04B 10/116* (2013.01)
*H04B 10/11* (2013.01)
(52) U.S. Cl.
CPC .................. *H04B 10/116* (2013.01)
(58) Field of Classification Search
USPC ........................................ 398/172
See application file for complete search history.

(56) References Cited

U.S. PATENT DOCUMENTS

| 2008/0181617 | A1 | 7/2008 | Ann |
| 2009/0274462 | A1* | 11/2009 | Yu .................................. 398/68 |
| 2010/0034540 | A1 | 2/2010 | Togashi |
| 2011/0229130 | A1* | 9/2011 | Yokoi ............................ 398/43 |

FOREIGN PATENT DOCUMENTS

| JP | 2000-124860 | 4/2000 |
| JP | 2001-189660 | 7/2001 |

(Continued)

OTHER PUBLICATIONS

PCT/ISA/237 Written Opinion issued on PCT/KR2009/006919 (4 pp.).
PCT/ISA/210 Search Report issued on PCT/KR2009/006919 (3 pp.).

(Continued)

*Primary Examiner* — Nathan Curs
(74) *Attorney, Agent, or Firm* — The Farrell Law Firm, P.C.

(57) ABSTRACT

A visible ray communication system and method that improve transmission rate and remove an influence of inter-color interference to improve the communication quality. A transmission apparatus included in the visible ray communication system allocates each carrier signal component of an OFDM signal, which is modulated into transmission information, to a plurality of LEDs of different colors. The information is added to a combination of a carrier frequency and an LED wavelength, when a carrier signal is allocated to an, in addition to each carrier signal being modulated into the information.

26 Claims, 5 Drawing Sheets

(56) References Cited

FOREIGN PATENT DOCUMENTS

| | | | |
|---|---|---|---|
| JP | 2004173153 | 6/2004 | |
| JP | 2005-345553 | 12/2005 | |
| JP | 2005-354553 | 12/2005 | |
| JP | 2008-252444 | * 10/2008 | ............. H04B 10/02 |
| JP | 2008-252570 | 10/2008 | |
| JP | 2008252444 | 10/2008 | |
| KR | 1020080066893 A | 7/2008 | |

OTHER PUBLICATIONS

Afgani et al., "Visible Light Communication Using OFDM", Testbeds and Research Infrastructures for the Development of Networks and Communities, Mar. 1, 2006.

Elgala et al., "OFDM Visible Light Wireless Communication Based on White LEDs", IEEE VTS Vehicular Technology Conference, Apr. 1, 2007.

Korean Office Action dated Jan. 4, 2016 issued in counterpart application No. 10-2011-7014621, 6 pages.

* cited by examiner

TABLE 1: COMPARISON OF INFORMATION TRANSMISSION QUANTITY

| NUMBER OF LEDS (NC) | NUMBER OF CARRIERS (NF) | TRANSMISSION DATA QUANTITY (EMBODIMENT) | TRANSMISSION DATA QUANTITY (WDM) |
|---|---|---|---|
| 3 | 3 | 3.87 BITS | 3 BITS |
| 3 | 4 | 3.74 BITS | 3 BITS |
| 3 | 10 | 3.42 BITS | 3 BITS |
| 3 | 100 | 3.20 BITS | 3 BITS |
| 4 | 4 | 4.80 BITS | 4 BITS |
| 5 | 5 | 5.54 BITS | 5 BITS |

VISIBLE RAY COMMUNICATION SYSTEM AND METHOD FOR TRANSMITTING SIGNAL

PRIORITY

This application claims priority under 35 U.S.C. §119(a) to a Japanese Patent Application filed in the Japan Intellectual Property Office on Nov. 25, 2008, assigned Serial No. 298940/2008, and to PCT/KR2009/006919 filed Nov. 24, 2009, the disclosure of each of which is hereby incorporated by reference.

BACKGROUND OF THE INVENTION

1. Field of the Invention

The present invention relates to a visible ray communication system and a method for transmitting a signal therein.

2. Description of the Related Art

Optical communication technology using a visible light region is receiving more attention. For example, researchers are investigating an illuminating device, such as a Light Emitting Diode (LED), as a potential technology for achieving high speed data communication.

As a light emitting device for high speed optical data communication, an LED is a leading candidate in consideration of an influence on a human body or medical appliances. However, a semiconductor light emitting element with a higher speed response performance, such as a Laser Diode (LD) or a Super Luminescent Diode (SLD), is another proposed candidate. The data transmission speed in optical communication depends on a response speed of a light emitting element. Accordingly, light emitting elements with higher speed response performances are currently receiving more attention.

Also, in order to further improve the data transmission speed, a technology for stably transmitting large amounts of data in one signal emitted from a light emitting element is desired. For example, Japanese Patent Laid-Open Publication HEI 2008-252444 discloses a technology for preventing spatial interference by allocating a time axis of an Orthogonal Frequency-Division Multiplexing (OFDM) signal in a spatial direction.

If an OFDM scheme is used, it is possible to improve the frequency use efficiency and multi-pass resistance. Therefore, the OFDM scheme is widely used in a wireless communication system (e.g., a wireless Local Area Network (LAN)) or a wired communication system (e.g., Asymmetric Digital Subscriber Line (ADSL)). An OFDM scheme is also expected to improve the communication quality in the visible ray communication. However, there is a problem of increasing a Peak to Average Power Ratio (PAPR) in the OFDM scheme. That is, a large dynamic range is required in a transmitter and receiver.

Accordingly, if the OFDM scheme is applied to the visible ray communication utilizing an LED, a large amount of current is supplied to the LED. For example, current of several 100 mA to several A flows to the LED. Therefore, a drive circuit is then installed, which is capable of handling a signal having a wide dynamic range on a transmission side. However, a conventional LED is designed for emitting light of a certain light quantity. Therefore, requiring a specific device to handle the signal of the large dynamic range is inconvenient, if even possible.

If the OFDM scheme is applied to the visible ray communication, as much transmission data as the number of carriers are generated through serial-to-parallel conversion in the transmission side. Each of the transmission data is allocated to a carrier signal to be added, and light emission of an LED is controlled in a light-emitting strength according to signal amplitude, after the corresponding addition.

Further, if a plurality of LEDs of different light-emitting colors (light frequency) is used, there are concerns on influence of inter-color interference generated by a frequency property of the LEDs and Photo Diodes (PDs), but there is an orthogonal property between the carriers as described above so that the influence by the inter-color interference is prevented. Therefore, it is possible to increase the number of multiplexing operations (the number of colors) by a certain degree and improve the transmission rate. However, the frequency between the colors is adjacent according to the increase of the number of multiplexing operations and thus the influence of inter-color interference increases, such that there is a limitation in an effect of transmission rate increase through the increase of the number of multiplexing operations. For this reason, in order to more improve the transmission rate, technology for transmitting more data with the same number of multiplexing operations is required.

SUMMARY OF THE INVENTION

Accordingly, the present invention has been designed to solve at least the above-stated problems occurring in the prior art, and an object of the present invention is to provide a novel and improved visible ray communication system and a method for transmitting a signal, which improve the communication quality that can be obtained using an OFDM scheme, without requiring a light-emitting device to handle a large dynamic range, and transmit more data with the same number of multiplexing operations.

In accordance with an object of the present invention, there is provided a visible ray communication system including a transmission apparatus and a reception apparatus.

The transmission apparatus includes a plurality of light emitting devices for emitting light of different colors; a serial-to-parallel convertor for serial-to-parallel converting serial transmission data into N parallel data signals and a control signal; a modulator for generating N modulation signals by modulating the N parallel data signals output from the serial-to-parallel convertor; a sine wave signal multiplier for generating N carrier signals by respectively multiplying the N modulation signals by N sine wave signals having an orthogonal carrier frequency; a carrier allocation unit for receiving the N carrier signals and the control signal, allocating the N carrier signals to the plurality of light emitting devices based on the control signal, adding carrier signals allocated to same light emitting devices, and generating a transmission signal for each of the plurality of light emitting devices; and a light emitting controller for controlling each of the plurality light emitting devices to emit light at a light emitting strength according to a signal amplitude of its respective transmission signal.

Further, the reception apparatus includes a plurality of light receiving devices for receiving the light of the different colors and outputting a reception signal of each color; a Fast Fourier Transform (FFT) unit for FFT processing the reception signals output from the plurality of light receiving devices using the N sine wave signals to extract the N modulation signals; a demodulator for demodulating the N modulation signals extracted to restore the N parallel data signals; a restoration unit for detecting a relationship between a carrier signal and a light emitting device of each color based on the N modulation signals and restoring the control signal from the N modulation signals; and a parallel-to-serial convertor for parallelto-serial converting the N parallel data signals and the control signal to restore the serial transmission data.

In accordance with another object of the present invention, a method for transmitting a signal is provided. The method includes serial-to-parallel converting, by a transmitter including a plurality of light emitting devices, serial transmission data into N parallel data signals and a control signal; modulating the N parallel data signals to generate N modulation signals; generating N carrier signals by multiplying the N modulation signals by N sine wave signals having an orthogonal carrier frequency, respectively; allocating the N carrier signals to the plurality of light emitting devices based on the control signal; adding carrier signals allocated to a same light emitting device; generating a transmission signal for each of the plurality of light emitting devices; controlling each of the plurality of light emitting devices to emit light in a light emitting strength according to signal amplitude of its transmission signal; receiving, by a receiver including a plurality of light reception devices, the emitted light of different colors; FFT processing a reception signal output from each of the plurality of light receiving devices using the N sine wave signals to extract the N modulation signals for each color; demodulating the N modulation signals to restore the N parallel data signals; detecting a relationship between each of the N carrier signals and the plurality of light emitting devices of each color based on the N modulation signals; restoring the control signal based on the relationship; and parallel-to-serial converting the N parallel data signals the control signal to restore the serial transmission data.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF EMBODIMENTS OF THE INVENTION

Hereinafter, various embodiments of the present invention will be described with reference to the accompanying drawings. In the following description, detailed explanations of known functions and constitutions may be omitted to avoid unnecessarily obscuring the subject matter of the present invention.

Figure 1:
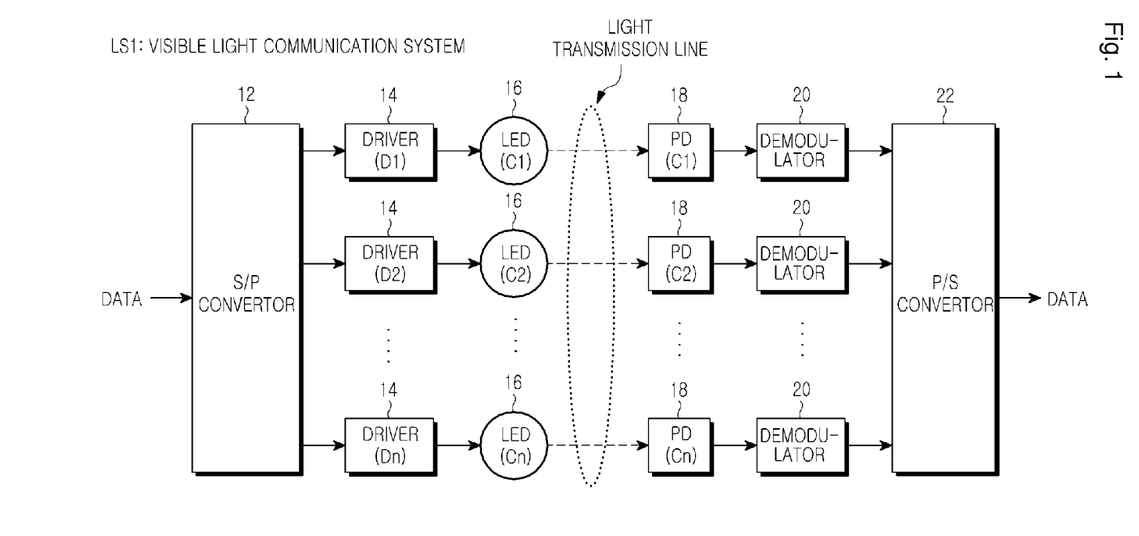
FIG. 1 is a diagram illustrating a visible ray communication system using a Wavelength Division Multiplexing (WDM) scheme.

FIG. 1 is a diagram illustrating a visible ray communication system using a Wavelength Division Multiplexing (WDM) scheme. First, the construction of a visible ray communication system LS1 employing a WDM scheme and the problem of the WDM scheme will be described with reference to FIG. 1.

A conventional visible ray communication system using an LED as a light source emits white light using a white LED and emits white light by combining a plurality of LEDs emitting different colored light (e.g., primary colors Red (R), Green (G), and Blue (B)). The RGB-emitting LED is characterized in the faster response rate than the white LED in light modulation. Further, a system using a plurality of LEDs modulates each of the LEDs into different data and combines the RGB light emission so that it is possible to transmit the data at a high speed. As such, a scheme for transmitting different data in the plurality of LEDs emitting light of different colors is referred to as a color division multiplexing scheme or WDM scheme. An example of visible ray communication technology in the WDM scheme is provided in Japanese Patent Publication No. 2007-81703.

Referring to FIG. 1, a transmission side of the visible ray communication system LS1 includes an Serial-to-Parallel (S/P) convertor 12, a plurality of driver circuits 14, and a plurality of light emitting devices 16, e.g., LEDs. The plurality of light emitting devices 16 emit light of different colors C1 to Cn (light frequency). The receiving side of the visible ray communication system LS1 includes a plurality of light receiving devices 18, e.g., PDs, a plurality of demodulators 20, and a Parallel-to-Serial (P/S) convertor 22. The plurality of light emitting devices 18 receive light of different colors C1 to Cn (light frequency). For example, the light emitting device 16 can use the LED emitting light of each color. Further, the light receiving device 18 can use the PD including a color filter that transmits each color.

In the visible ray communication system LS1, transmission data is first serial-to-parallel converted by the S/P convertor 12, generating N parallel data streams. That is, a parallel data stream is generated for each of the light emitting devices 16. The parallel data is capable of being allocated to each color C1 to Cn.

Further, each of the parallel data streams is input to a driver circuit 14. The driver circuits 14 then make their corresponding the light emitting device 16 emit the light at a light-emitting strength based on the input parallel data streams. The light generated through the light emitting devices 16 of each color C1 to Cn is received in the light receiving devices 18 of each color C1 to Cn. If the light of the color corresponding to each light receiving device 18 is received, the signal according to the light receiving strength of the corresponding color is output from the light receiving device 18. The signal output from the light receiving device 18 is demodulated in the demodulator 20 and restored in the original transmission data by the P/S convertor 22.

In the visible ray communication system LS1, the deterioration of the transmission quality occurs because (1) the degradation of the light strength in a light transmission line, (2) noise generation from external light, (3) variation of signal strengths between colors, and (4) signal interference between colors.

Of the four (4) reasons above, only reason (3) is generated due to the characteristic of the light emitting strength of the light emitting device 16 and the characteristic of the photosensitivity of the light receiving device 18.

Reason (4) is generated due to the frequency characteristic of the light emitting device 16 and the light receiving device 18, and is great in the WDM scheme. Specifically, in order to improve the transmission rate by increasing a number of colors and a number of multiplexing operations, the deterioration of the transmission quality by the reason (4) becomes a substantial problem because as the number of multiplexing operations increases, the frequency of each color is adjacent, such that the inter-color interference increases. Therefore, in order to better improve the transmission rate, the removal of the inter-color interference and the transmission of more data with the same number of multiplexing should be used.

Figure 2:
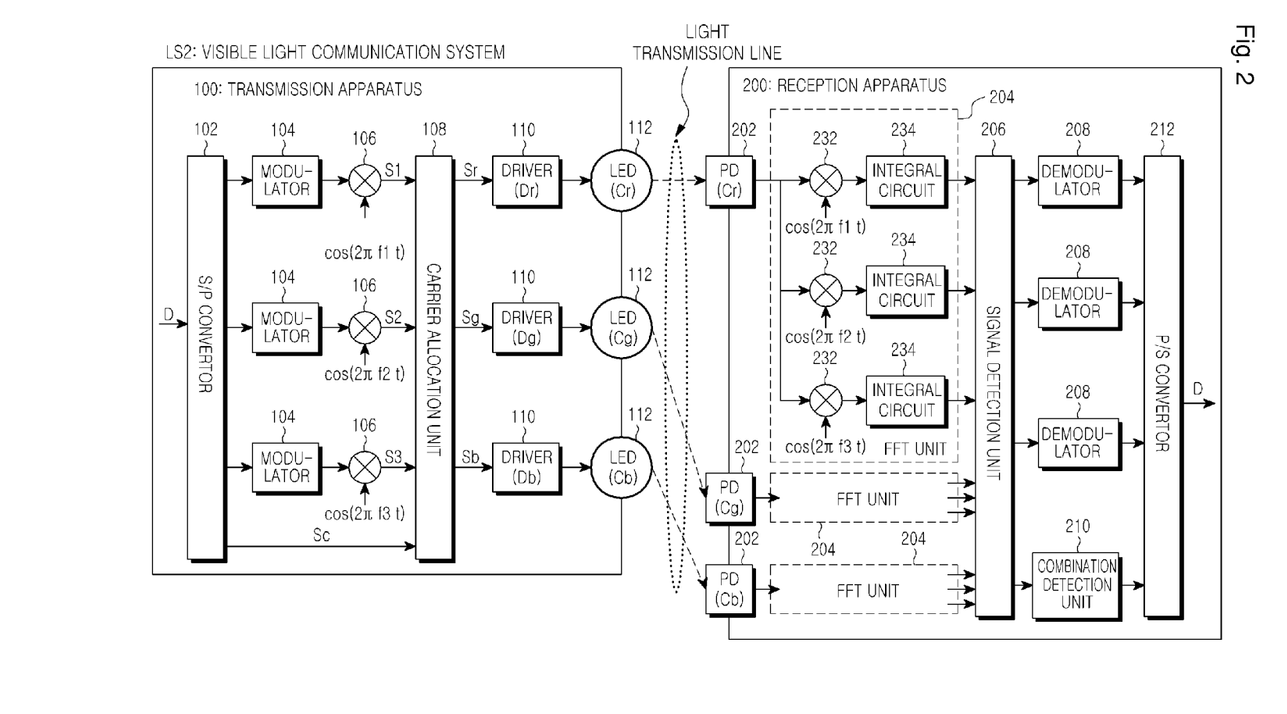
FIG. 2 is a diagram illustrating a visible ray communication system according to an embodiment of the present invention.

FIG. 2 is a diagram illustrating a visible ray communication system LS2 according to an embodiment of the present invention. For description convenience, 3 carriers, 3 light emitting devices 112, and 3 light receiving devices 202 are included in FIG. 2. Of course, the present embodiment can also be applied when there are 3 or more carriers, light emitting devices 112, and light receiving devices 202.

Referring to FIG. 2, the visible ray communication system LS2 includes a transmission apparatus 100 and a reception apparatus 200. The transmission apparatus 100 includes an S/P convertor 102, 3 modulators 104, 3 multipliers 106, a carrier allocation unit 108, 3 driver circuits 110, and 3 light emitting devices 112. Accordingly, the reception apparatus 200 includes 3 light receiving devices 202, 3 FFT units 204, a signal detection unit 206, 3 demodulators 208, a combination detection unit 210, and a P/S convertor 212. Although only illustrated in the FFT unit 204 connected to the light receiving device (PD (Cr)) 202, each of the FFT units 204 includes a multipliers 232 and integral circuits 234.

In the description of FIG. 2, detailed descriptions are omitted for each of FFT units 204 to which an output signal of the light receiving devices (PD (Cg) PD (Cb)) 202, are input, as their descriptions are the same as the FFT unit 204 connected to the light receiving device (PD (Cr)) 202.

In FIG. 2, transmission data D is S/P converted by the S/P convertor 102, generating 4 parallel streams, 3 of which are input to the modulators 104, respectively, and modulated with a predetermined number of dimensions (e.g., a value of 2). Modulated signals are then output from the modulators 104 to the multipliers 106. The parallel stream not input to the modulators 104 is a control data row Sc for allocating the carrier and is input to the carrier allocation unit 108.

In the multipliers 106, a carrier sine wave signal corresponding to each carrier frequency f1, f2, and f3 is multiplied to the modulated signals, respectively. The 3 carrier sine wave signals corresponding to each carrier frequency f1, f2, and f3 are orthogonally related to each other in the OFDM scheme.

The modulated signals multiplied by the carrier sine wave signal in the multipliers 106 (hereinafter, carrier signals S1, S2, and S3) are input to the carrier allocation unit 108. The carrier allocation unit 108 determines which carrier is allocated to which color and generates a signal used for controlling the light emission of each color. The allocating method is determined by the control data row Sc from the S/P convertor 102. A detailed description of a carrier allocation unit 108 will be described later.

The signal allocated to each color (hereinafter, a color allocation signal) in the carrier allocation unit 108 is input to the driver circuits 110 corresponding to each color. The driver circuits 110 control current quantity supplied to the light emitting devices 112 based on the inputted color allocation signal and control each respective light emitting device 112 to emit light at a light-emitting strength according to the amplitude of the color allocation signal.

For example, the color allocation signal Sr allocated to red color R (light frequency Cr) is input to the driver circuit (Dr) 110 for driving the light emitting device (LED (Cr)) 112 that emits red light. The driver circuit (Dr) 110 drives the light emitting device (LED (Cr)) 112 to emit the red light at a light-emitting strength according to the amplitude of the color allocation signal Sr. The same procedure occurs for the color allocation signals Sg and Sb allocated to the green light (light frequency Cg) and blue light (light frequency Cb). The light generated from each light emitting device 112 is received in a corresponding reception apparatus 202 of each color of the reception apparatus 200. For example, the light receiving device 202 uses 3 PDs including a color filter corresponding to each color.

When the light is received by each light receiving device 202, an electric signal (hereinafter, a reception signal) according to the light strength of each color is output from the light receiving devices 202. The reception signals of the colors output from the light receiving devices 202 are input to the FFT units 204 provided for each color. Each FFT unit 204 extracts a carrier frequency component included in the color allocation signal of each color by executing FFT processing for each reception signal.

As described, for description convenience, only the FFT processing executed for the reception signal output from the light receiving device 202 corresponding to the red R will be described.

First, the reception signal output from the light receiving device (PD (Cr)) 202 is input to the multiplier 232. The carrier sine wave signal corresponding to each carrier frequency f1, f2, and f3 is multiplied to the reception signal in the multipliers 232. The reception signals multiplied by the carrier sine wave signal in the multipliers 232 are input to the integral circuits 234. The integral circuits 234 execute integral operations for an integral block up to an OFDM symbol length T on a time axis with respect to the output signal of the multipliers 232 and extracts the signal components corresponding to each carrier frequency f1, f2, and f3, respectively. Each carrier frequency component extracted in the integral circuits 234 is input to the signal detection unit 206. For example, the carrier signals S1 and S2 corresponding to the carrier frequency f1 and f2 are allocated to the red color R, the signal component (modulation signal) corresponding to the carrier signal S1 and S2 are input in the signal detection unit 206. As indicated above, although not described herein, the same processing is actually executed for the green color G and blue color B.

As described above, each carrier component included in the color allocation signal of each color is separated by the FFT unit 204 of each color and the separated carrier component of each color is input to the signal detection unit 206. Therefore, the signal detection unit 206 can detect which carrier signal is included in which color allocation signal. For example, as illustrated in FIG. 5, the signal detection unit 206 can detect a type of the carrier signal included in each color allocation signal based on a total of 9 signals (corresponding to the modulation signal) input from 3 FFT units 204.

Figure 5:
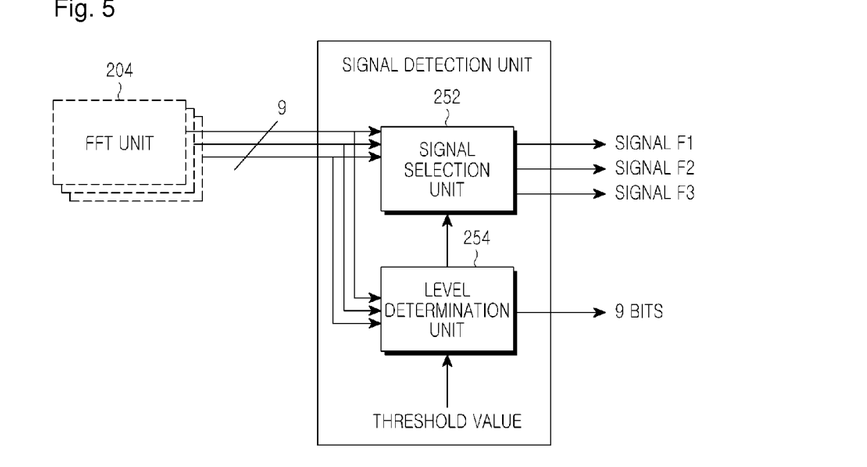
FIG. 5 is a diagram illustrating a signal detection unit according to an embodiment of the present invention.

Referring to FIG. 5, the signal detection unit 206 includes a signal selection unit 252 and a level determination unit 254. As described above, the signal detection unit 206 receives 3 carrier components from each FFT unit 204, respectively, so that a total of 9 carrier components are input to the signal detection unit 206. The 9 carrier components are input to the signal selection unit 252 and the level determination unit 254. Further, a predetermined threshold value is input to the level determination unit 254. Therefore, the level determination unit 254 determines if the signal amplitude of each carrier component exceeds the predetermined threshold value.

For example, the predetermined threshold value is set as a value that is higher than a noise level and lower than the signal amplitude of the carrier component including information of the carrier signal. If the signal amplitude of the carrier component is below the predetermined threshold value, this indicates that the carrier component does not include the carrier signal. The determination processing is executed for each of the 9 carrier components and the existence or nonexistence of the carrier signal is output to the combination detection unit 210 at a rear end in a 9 bits data. Further, if the level determination unit 254 determines that the carrier signal exists in the carrier component, the information of the carrier component is input to the signal selection unit 252. The signal selection unit 252 selects only the carrier components including the information of the carrier signal based on the information input from the level determination unit 254 to output the selected carrier component to each demodulator 208.

Therefore, the 9 bits of data detected from the level determination unit 254 represents the relationship between each color allocation signal and each carrier signal. Further, the carrier component selected in the signal selection unit 252 corresponds to the modulation signal of each carrier frequency f1, f2, and f3. Therefore, the information representing the relationship between the color allocation signal and the carrier signal is input in the combination detection unit 210.

Further, the modulation signal corresponding to the modulation signal of each carrier frequency f1, f2, and f3 is input to each demodulator 208. Such that, the signal detection unit 206 detects an allocation method determined in the carrier allocation unit 108 of the transmission apparatus 100. The allocation method is determined based on the control data row Sc for the carrier allocation. Conversely, if the allocation method can be detected, the control data row Sc for the carrier allocation can be detected based on the detection result.

The combination detection unit 210 detects the control data row Sc for the carrier allocation based on the relationship between each color allocation signal and carrier signal input from the signal detection unit 206. The control data row Sc for the carrier allocation detected in the combination detection unit 210 is input to the P/S convertor 212.

Each demodulator 208 performs demodulation processing for the input modulated signal to demodulate the original parallel data. The parallel data demodulated by each demodulator 208 is input to the P/S convertor 212. The PS convertor 212 P/S converts the parallel data input from each of the demodulators 208 and the control data for the carrier allocation input from the combination detection unit 210 to restore the parallel data into the transmission data D. Through carrying the data on the combination that allocates each carrier to each color, more data can be transmitted with the same number of colors (i.e., using same the number of multiplexing operations).

As described above, according to an embodiment of the present invention, the carrier signal corresponding to each carrier frequency is not added in a front end of the driver circuit 110 and each light emitting device 112 emits the light in the light emitting strength according to the signal amplitude of each carrier signal. Accordingly, the problem of the PAPR increase is addressed in the OFDM scheme and the dynamic range required for the driver circuit 110 of each color and the light emitting device 112 can be controlled to be low. As a result, it is possible to achieve the improved effect of the communication quality in the OFDM scheme by using a compact and cheap LED driving circuit and LED. Further, each parallel data stream can be allocated to the orthogonal carrier sine wave signal so that the influence by the inter-color interference can be removed. Further, the data is carried on the carrier allocation method and transmitted so that it is possible to simultaneously transmit the data of the number of colors and the transmission rate can be improved without increasing the number of multiplexing operations. As a result, the transmission rate can be greatly improved in the visible ray communication.

Figure 3:
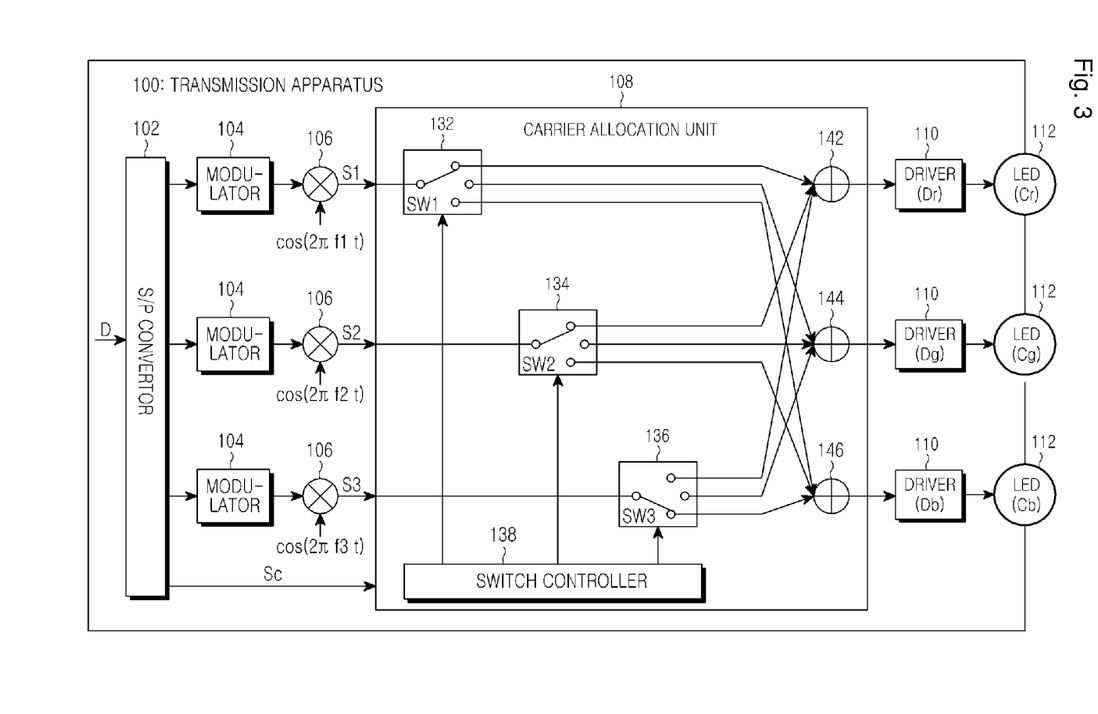
FIG. 3 is a diagram illustrating a transmission apparatus according to an embodiment of the present invention.

FIG. 3 is a diagram illustrating a carrier allocation unit 108 according to an embodiment of the present invention.

Referring to FIG. 3, the carrier allocation unit 108 includes 3 switches 132, 134, and 136, a switch controller 138, and 3 adders 142, 144, and 146. The carrier signal S1 corresponding to the carrier frequency f1 is input from the multiplier 106 to the switch (SW1) 132. The carrier signal S2 corresponding to the carrier frequency f2 is input from the multiplier 106 to the switch (SW2) 134. The carrier signal S3 corresponding to the carrier frequency f3 is input from the multiplier 106 to the switch (SW3) 136. Further, the control data row Sc for the carrier allocation is input to the switch controller 138.

The switches (SW1, SW2, and SW3) 132, 134, and 136 each include 3 output ports, respectively. For example, the switch (SW1) 132 outputs the carrier signal S1 input to an input port to any output port according to the switch control by the switch controller 138. The 3 output ports correspond to the light emitting devices (LED(Cr), LED(Cg), and LED(Cb)) 112 of each color, respectively. That is, by selecting the output port of the switch (SW1) 132, the color allocated by the carrier signal S1 is determined. Likewise, the switch (SW2) 134 outputs the carrier signal S2 input to an input port to any one output port according to the switch control by the switch controller 138. Further, the switch (SW3) 136 outputs the carrier signal S3 input to an input port to any one output port according to the switch control by the switch controller 138.

As described above, the output port of the switches (SW1, SW2, and SW3) 132, 134, and 136 corresponds to the light emitting devices (LED(Cr), LED(Cg), and LED(Cb)) 112 of each color, respectively. Accordingly, the signal output from the output port corresponding to the same color is input to the adders 142, 144, and 146, regardless of the type. For example, in the output port corresponding to the red color R, the light emitting device (LED(Cr)) 112 of the red color R is driving controlled by the driver circuit (Dr) 110. Further, the driver circuit (Dr) 110 drives the light emitting device (LED(Cr)) 112 in the light emitting strength according to the amplitude of the signal outputted from the adder 142. Therefore, the adder 142 corresponds to the red color R. Likewise, the adder 144 corresponds to the green color G, and the adder 146 corresponds to the blue color B.

Therefore, the signal is input to the adder 142 from the output port corresponds to the red color R of the switches (SW1, SW2, and SW3) 132, 134, and 136. Likewise, the signal is input to the adder 144 from the output port corresponds to the green color G of the switches (SW1, SW2, and SW3) 132, 134, and 136. Further, the signal is input to the adder 146 from the output port corresponds to the blue color B of the switches (SW1, SW2, and SW3) 132, 134, and 136. Each of the input signals is added in the adders 142, 144, and 146. The signal (color allocation signal) output from the adders 142, 144, and 146 is input to the driver circuit 110. The driver circuit 110 controls the light emitting device 112 in the light emitting strength according to the amplitude of the input color allocation signal. The light emitting device 112 emits light of a corresponding color according to the light emitting control by the driver circuit 110.

As described above, if the carrier signals S1, S2, and S3 are input, the carrier allocation unit 108 receives the switch control from the switch controller 138 and the switches 132, 134, and 136 allocate the carrier signals S1, S2, and S3 to each color. The carrier signals S1, S2, and S3 allocated to each color are added and the light of each color is emitted based on the color allocation signal generated through the adding processing.

In FIG. 3, 3 carrier signals S1, S2, and S3 are allocated to 3 colors Cr, Cg, and Cb. Therefore, the number of combinations is $3^3=27$. Accordingly, the transmittable data quantity through the allocation processing by the switch controller 138 is calculated by Equation (1) below to be 4.75 bits. That is, using the carrier allocation unit 108 illustrated in FIG. 3, it is possible to transmit the data of 4.75 bits by being added to the data quantity transmitted with the carrier signals S1, S2, and S3.

$$\log_2 27 = 4.75 [bits] \quad (1)$$

Further, for description convenience, the number of carriers and light emitting devices 112 (colors) are limited in 3. However, any number of carriers and colors can be applied in the construction of the present embodiment. For example, if the number of carriers is $n_f$ and the number of colors is $n_c$, the data quantity Ik additionally transmittable through the allocation method can be represented as shown in Equation (2) below. Therefore, the data quantity I transmittable by the transmission apparatus 100 according to an embodiment of the present invention can be represented by Equation (3).

$$I_k = \log_2 n_c^{n_f} [bits] \quad (2)$$

$$I = \left(N_B n_c + \log_2 n_c^{n_f}\right) S \frac{2}{n_f + 1} [bits] \quad (3)$$

In Equations (2) and (3), $N_B$ represents the number of bits per 1 symbol of the modulation wave of each carrier. Further, a coefficient, $(2/(n_f+1))$ represents a data compression ratio obtained through the increase of the number of carriers and the band division. By carrying the coefficient, it is possible to directly compare the data quantity transmittable in the visible ray communication system LS1 in the WDM scheme with the data quantity transmittable in the visible ray communication system LS2 according to the embodiment of the present invention. Further, it is possible to change the modulation scheme in the modulator 104 for each carrier, although it is assumed herein that the identical modulation scheme can be used for every carrier. The result of the comparison of the data quantity transmittable in the visible ray communication system LS1 in the WDM scheme with the data quantity transmittable in the visible ray communication system LS2 according to an embodiment of the present invention, based on formula (3), is represented in Table 1 of FIG. 6.

As described above, in the WDM scheme, the number of bits per 1 symbol is the transmittable data quantity, but in accordance with an embodiment the present invention, the symbol length is changed according to the number of carriers. Accordingly, the transmittable data quantity in accordance with an embodiment the present invention uses the data quantity multiplied by the coefficient so as to be equivalent with the symbol length in the WDM scheme.

Figure 6:
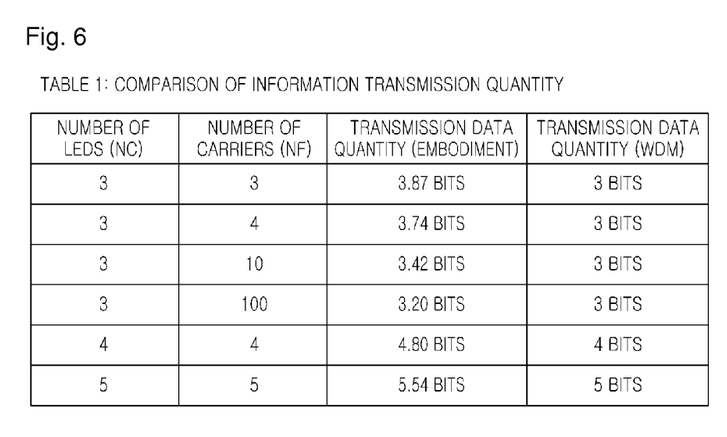
FIG. 6 is a diagram illustrating transmission performances according to an embodiment of the present invention.

Referring to FIG. 6, the data quantity according to an embodiment the present invention exceeds the data quantity in the WDM scheme without depending on the number $n_c$ of LEDs and the number $n_f$ of carriers. Further, it can be identified that if the number nf of carriers increases, the transmittable data quantity decreases very little. Through this, it is possible to construct to improve the multi-pass resistance by lengthening the symbol length of the OFDM without greatly decreasing the transmittable data quantity.

Figure 4:
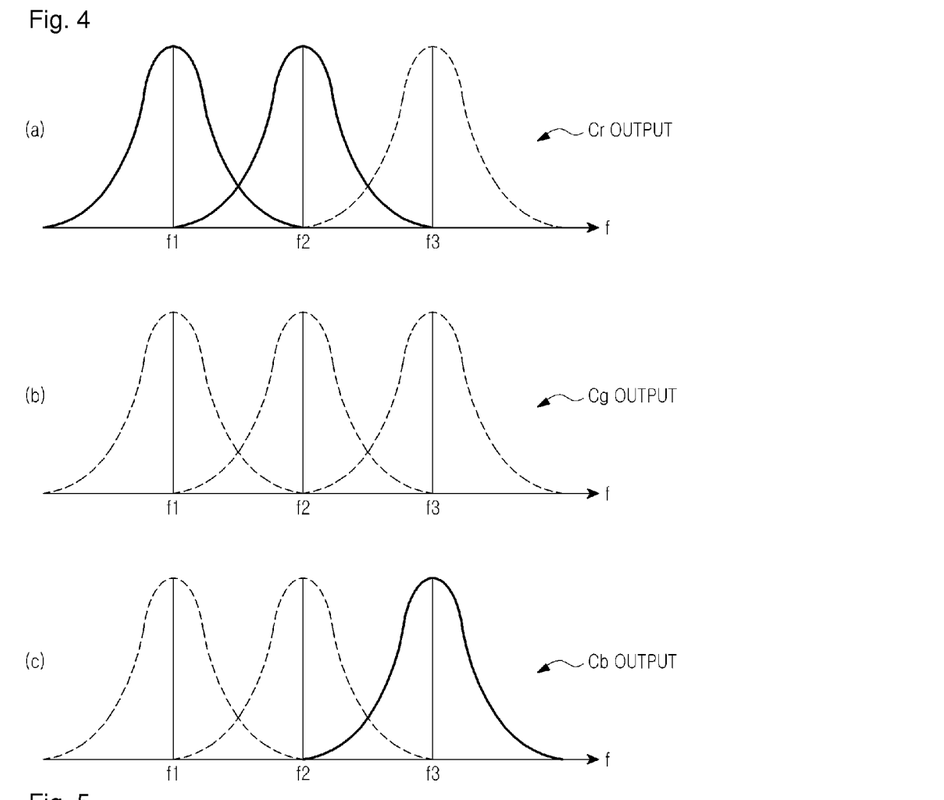
FIG. 4 illustrates graphs representing carrier allocation according to an embodiment of the present invention.

As illustrated in FIG. 3, if the carrier signals S1 and S2 are input to the adder 142 and the carrier signal S3 is input to the adder 146, the light of each color is generated from each light emitting device 112. FIG. 4 illustrates graphs representing signal distribution included in each light. In FIG. 4, graph (a) illustrates an output of the light emitting device (LED(Cr)) 112, graph (b) illustrates an output of the light emitting device (LED(Cg)) 112, and graph (c) illustrates an output of the light emitting device (LED(Cb)) 112. Further, the graphs are the spectrums including a solid line. According to the allocation example in FIG. 3, the signal of the carrier frequency f1 and f2 is represented in the signal distribution of the red color R (Cr output), there is no signal in the signal distribution of the green color G (Cg output), and the signal of the carrier frequency f3 is represented in the signal distribution of the blue color R (Cb output).

According to an embodiment of the present embodiment, when comparing a frequency spectrum of a single carrier signal, the Cr output is relatively wide. Therefore, if the single carrier signal emits light, the dynamic range required for the driver circuit 110 and the light emitting device 112 widens. However, when compared with the case where the carrier signal emits light based on the signal amplitude of the OFDM signal adding all of 3 carrier signals S1, S2, and S3, the dynamic range can be controlled to be low.

In accordance with an embodiment of the present invention, the requirement of the dynamic range performance imposed on each driver circuit 110 and light emitting device 112 is reduced. Therefore, if the switch controller 138 executes the color allocation of the carrier signals S1, S2, and S3, it is preferred that the entire carrier signals S1, S2, and S3 are not allocated to the same color.

Further, the carrier allocation unit 108 is configured not to allocate the same carrier signal S1, S2, and S3 to the different color. That is, the switch 132, 134, and 136 is configured in such a manner that the carrier signal input from the input port is not output to the plurality of output ports. If the same carrier signal is allocated to the different color, the orthogonality of the carrier frequency between the colors is diminished. Consequently, the transmission quality is deteriorated due to the influence of the inter-color interference. Therefore, in accordance with an embodiment of the present invention, the carrier allocation unit 108 is configured not to allocate the same carrier signal to the different color. Based on the foregoing, it is possible to maintain the characteristic of the OFDM scheme and remove the influence of the inter-color interference.

In the description above, an LED is exemplified for the light emitting device. However, the light emitting device can include a semiconductor light emitting device including an LD and SLD, a fluorescent lamp, a Cathode-Ray-Tube (CRT) display device, a Plasma Display Panel (PDP) device, an Organic Electroluminescent (EL) display device, a liquid Crystal Display (LCD), etc.

As described above, the visible ray communication system LS2 according to an embodiment of the present invention allocates each carrier signal component of the OFDM signal that is modulated into the transmission information with respect to the plurality of LEDs with different light color. Each carrier signal adds information on the combination of the carrier frequency, when the carrier signal is allocated to the LED, and the LED wavelength, in addition to being modulated into the information. Accordingly, the transmission rate can be improved in comparison with a conventional WDM scheme. At the same time, the influence of the inter-color interference that is the problem in the WDM scheme can be removed. As a result, the present invention improves communication quality and also improves the selection method for the LED or PD and the freedom degree of the number of LEDs or PDs to be installed.

Further, even though the number of carriers increases, the quantity of transmittable data is not greatly decreased, such that a visible ray communication system according to an embodiment of the present invention improves multi-pass resistance by increasing the number of carriers.

While the present invention has been shown and described with reference to certain embodiments thereof, it will be understood by those skilled in the art that various changes in form and details may be made therein without departing from the spirit and scope of the invention as defined by the appended claims.

The invention claimed is:

1. A visible ray communication system comprising:
a transmission apparatus including:
   a first processor for receiving N carrier signals and a control signal, and for allocating the N carrier signals to a plurality of light emitting diodes based on the control signal, adding carrier signals allocated to same light emitting diodes, and generating a transmission signal for each of the plurality of light emitting diodes; and
a reception apparatus including:
   a second processor for Fast Fourier Transform (FFT) processing reception signals output from a plurality of light receiving diodes based on N sinusoidal wave signals having respectively orthogonal carrier frequencies to extract N modulation signals,
wherein the N carrier signals are generated by multiplying the N modulation signals by respective N sinusoidal wave signals having the respectively orthogonal carrier frequencies, and wherein a relationship between a carrier signal and each of the plurality of light emitting diodes is based on the control signal.

2. The visible ray communication system as claimed in claim 1, wherein the first processor comprises:
N switches, each including an input port to which a respective carrier signal is input and a plurality of output ports corresponding to the plurality of light emitting diodes, respectively, for switching an output destination of each of the carrier signals input to the input port to any of the output ports;
a switch controller for controlling each of the N switches based on the control signal and controlling the output destination of the carrier signals input to each of the N switches; and
a plurality of adders each for adding carrier signals output from the output ports each corresponding to a respective one of the light emitting diodes for the N switches, the plurality of adders being same in number as the plurality of light emitting diodes.

3. The visible ray communication system as claimed in claim 1, wherein the first processor allocates carrier signals such that a same carrier signal is not allocated for different colors.

4. The visible ray communication system as claimed in claim 1, wherein the reception apparatus further comprises:
a signal determination unit for determining if each of the N carrier signals is included in the reception signals of each color; and
a combination detection unit for detecting combinations of each of the colors and carrier signals based on a determination result in the signal determination unit and restoring the control signal from a corresponding combination.

5. The visible ray communication system as claimed in claim 1, wherein the transmission apparatus further comprises:
a serial-to-parallel convertor for serial-to-parallel converting serial transmission data into N parallel data signals and the control signal; and
a modulator for generating the N modulation signals by respectively modulating the N parallel data signals output from the serial-to-parallel convertor.

6. The visible ray communication system as claimed in claim 5, wherein the reception apparatus further comprises:
a demodulator for demodulating the N modulation signals extracted to restore the N parallel data signals; and
a parallel-to-serial convertor for parallel-to-serial converting the N parallel data signals and the control signal to restore the transmission data.

7. A method for transmitting a signal in a visible ray communication system, comprising:
generating, by a transmitter, N carrier signals by respectively multiplying N modulation signals by N sine wave signals each having an orthogonal carrier frequency relative to the other sine wave signals;
allocating, by the transmitter, the N carrier signals to a plurality of light emitting diodes based on a control signal;
receiving, by a receiver including a plurality of light reception diodes, emitted light of different colors; and
Fast Fourier Transform (FFT) processing, by the receiver, reception signals output from each of the plurality of light receiving diodes based on the N sine wave signals having respectively orthogonal carrier frequencies to extract the N modulation signals,
wherein the N carrier signals are generated by multiplying the N modulation signals by respective N sinusoidal wave signals having the respectively orthogonal carrier frequencies, and
wherein a relationship between a carrier signal and each of the plurality of light emitting diodes is based on the control signal.

8. The method as claimed in claim 7, wherein allocating the N carrier signals to the plurality of light emitting diodes comprises:
respectively switching an output destination of each of respective carrier signals input to an input port to any of output ports, with N switches each including the input port to which each carrier signal is input and a plurality of the output ports respectively correspond to the plurality of light emitting diodes;
controlling each of the N switches based on the control signal and controlling the output destination of the carrier signals input to each of the N switches; and
adding carrier signals output from the output ports each corresponding to a respective one of the plurality of light emitting diodes for the N switches.

9. The method as claimed in claim 7, wherein allocating the N carrier signals to the plurality of light emitting diodes comprises:
allocating carrier signals such that a same carrier signal is not allocated for different colors.

10. The method as claimed in claim 7, further comprising:
determining if each of the N carrier signals is included in the reception signals of each color; and
detecting combinations of each of the colors and carrier signals based on a determination result and restoring the control signal from a corresponding combination.

11. The method as claimed in claim 7, further comprising:
serial-to-parallel converting, by a transmitter including the plurality of light emitting diodes, serial transmission data into N parallel data signals and the control signal; and
modulating, by the transmitter, the N parallel data signals to generate the N modulation signals.

12. The method as claimed in claim 11, further comprising:
adding, by the transmitter, carrier signals allocated to a same light emitting diode;
generating, by the transmitter, a transmission signal for each of the plurality of light emitting diodes; and
controlling, by the transmitter, each of the plurality of light emitting diodes to emit light in a light emitting strength according to a respective transmission signal amplitude.

13. The method as claimed in claim 12, further comprising:
detecting, by the receiver, a relationship between each of the N carrier signals and the plurality of light emitting diodes of each color based on the N modulation signals;
restoring, by the receiver, the control signal based on the detected relationship; and
parallel-to-serial converting, by the receiver, the N parallel data signals and the control signal to restore the serial transmission data.

14. The method as claimed in claim 11, wherein detecting the relationship between each of the N carrier signals and the plurality of light emitting diodes of each color comprises:
determining if each of the N carrier signals is included in the reception signals of each color; and
detecting combinations of each of the colors and the N carrier signals based on a determination result and restoring the control signal from a corresponding combination.

15. A transmission apparatus in a visible ray communication system, comprising:
a serial-to-parallel converter for serial-to-parallel converting serial transmission data into N parallel data signals and a control signal;
a modulator for generating N modulation signals by respectively modulating the N parallel data signals output from the serial-to-parallel converter; and
a processor for receiving N carrier signals and the control signal, and for allocating the N carrier signals to a plurality of light emitting diodes based on the control signal,
wherein the N carrier signals are generated by multiplying N modulation signals by respective N sinusoidal wave signals having respectively orthogonal carrier frequencies.

16. The transmission apparatus as claimed in claim 15, wherein the processor comprises:
N switches, each including an input port to which a respective carrier signal is input and a plurality of output ports corresponding to the plurality of light emitting diodes, respectively, for switching an output destination of each of the carrier signals input to the input port to any of the output ports;
a switch controller for controlling each of the N switches based on the control signal and controlling the output destination of the carrier signals input to each of the N switches; and
a plurality of adders each for adding carrier signals output from the output ports each corresponding to a respective one of the plurality of light emitting diodes for the N switches, with the plurality of adders being same in number as the plurality of light emitting diodes.

17. The transmission apparatus as claimed in claim 15, wherein the processor is further configured to allocate carrier signals such that a same carrier signal is not allocated for different colors.

18. A method for transmitting a signal by a transmitting apparatus in a visible ray communication system, comprising:
serial-to-parallel converting serial transmission data into N parallel data signals and a control signal;
modulating the N parallel data signals to generate N modulation signals;
generating N carrier signals by multiplying the N modulation signals by respective N sinusoidal wave signals having carrier frequencies respectively orthogonal to each other; and
allocating the N carrier signals to a plurality of light emitting diodes based on the control signal.

19. The method as claimed in claim 18, wherein allocating the N carrier signals to the plurality of light emitting diodes comprises:
controlling each of N switches based on the control signal and controlling an output destination of the N carrier signals input to each of the N switches;
switching the output destination of each of the carrier signals input to an input port to any of output ports, with the N switches each including the input port to which each carrier signal is input and a plurality of the output ports corresponding to the plurality of light emitting diodes, respectively; and
adding carrier signals allocated to a same light emitting diode.

20. The method as claimed in claim 18, wherein allocating the N carrier signals to the plurality of light emitting diodes comprises:
allocating carrier signals such that a same carrier signal is not allocated for different colors.

21. A reception apparatus in a visible ray communication system, comprising:
a processor for Fast Fourier Transform (FFT) processing reception signals output from a plurality of light receiving diodes based on N sinusoidal wave signals having respectively orthogonal carrier frequencies to extract N modulation signals, wherein each of the reception signals has one color;
wherein a relationship between a carrier signal and each of a plurality of light emitting diodes is based on a control signal.

22. The reception apparatus as claimed in claim 21, further comprising:
a signal determination unit for determining if each of N carrier signals is included in the reception signals of each color; and
a combination detection unit for detecting combinations of each of the colors and carrier signals based on a determination result in the signal determination unit and restoring the control signal from a corresponding combination.

23. The reception apparatus as claimed in claim 21, wherein the plurality of light receiving diodes receive light of different colors and output reception signals of each color.

24. The reception apparatus as claimed in claim 21, further comprising:
a demodulator for demodulating the N modulation signals extracted to restore N parallel data signals; and
a parallel-to-serial convertor for parallel-to-serial converting the N parallel data signals and the control signal to restore transmission data.

25. A method for receiving a signal by a reception apparatus in a visible ray communication system, comprising:
Fast Fourier Transform (FFT) processing reception signals output from each of a plurality of light receiving diodes based on N sinusoidal wave signals having respectively orthogonal carrier frequencies to extract N modulation signals, wherein a relationship between a carrier signal and each of a plurality of light emitting diodes is based on a control signal.

26. The method as claimed in claim 25, further comprising:

demodulating the N modulation signals to restore N parallel data signals;

detecting the relationship between each of N carrier signals and each of the plurality of light emitting diodes based on the N modulation signals;

restoring the control signal based on the detected relationship; and parallel-to-serial converting the N parallel data signals and the control signal to restore transmission data.

* * * * *